United States Patent [19]
Harrup

[11] Patent Number: 5,931,266
[45] Date of Patent: Aug. 3, 1999

[54] VISUAL WEAR INDICATOR FOR BRAKE SYSTEM

[75] Inventor: Clive James Harrup, Bromham, United Kingdom

[73] Assignee: Meritor Heavy Vehicle Systems, LLC

[21] Appl. No.: 08/831,876

[22] Filed: Apr. 2, 1997

[51] Int. Cl.[6] .................................................... F16D 66/00
[52] U.S. Cl. ..................................................... 188/1.11 W
[58] Field of Search .................... 188/1.11 W, 1.11 R, 188/79.51, 79.55, 72.9, 196 BA, 196 V

[56] References Cited

U.S. PATENT DOCUMENTS

| | | | |
|---|---|---|---|
| 2,002,139 | 5/1935 | Rosiers | 188/1.11 W X |
| 2,545,276 | 3/1951 | Hagedorn | 188/1.11 W X |
| 5,535,854 | 7/1996 | Prince | 188/1.11 W X |
| 5,664,646 | 9/1997 | Bejot et al. | 188/72.9 X |

FOREIGN PATENT DOCUMENTS

| | | | |
|---|---|---|---|
| 1287484 | 2/1962 | France | 188/1.11 W |
| 2076913 | 12/1981 | United Kingdom | 188/1.11 W |

Primary Examiner—Peter M. Poon

[57] ABSTRACT

A visual wear indicator for a brake system generally comprises an input shaft rotatably mounted in a housing. The input shaft is coupled to a rotating part in a brake adjustment assembly. The input shaft is connected via gearing to a marker which rotates relative to a face in order to indicate the level of brake wear.

20 Claims, 2 Drawing Sheets

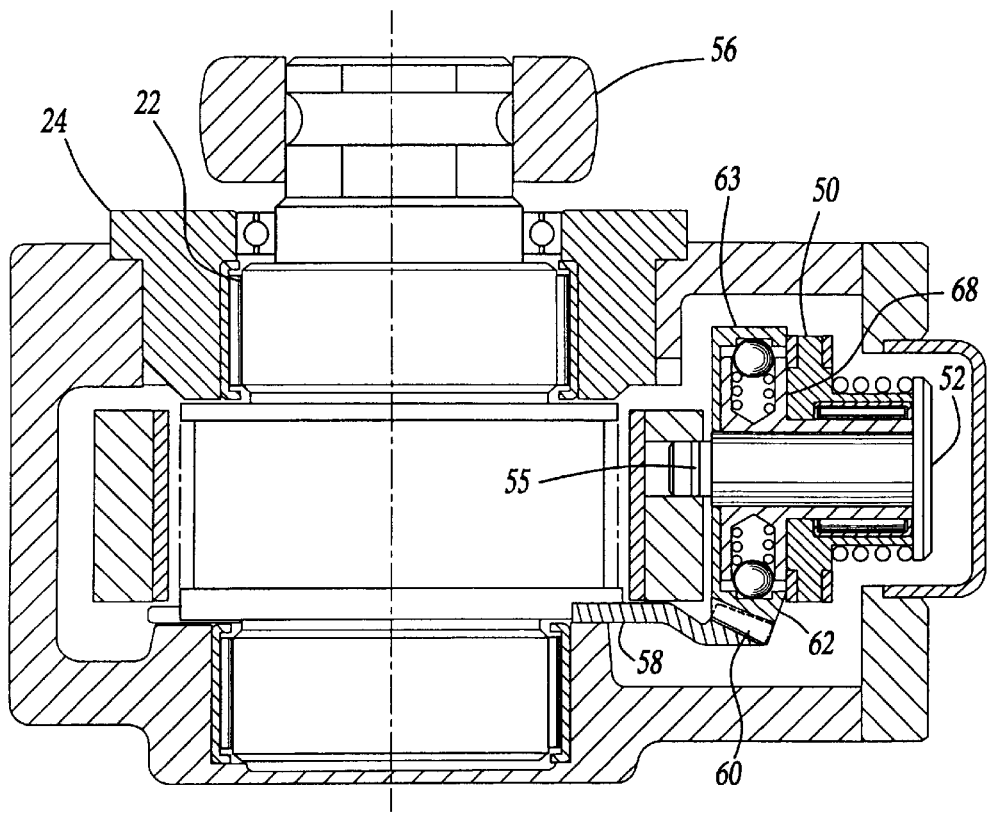
Fig-2
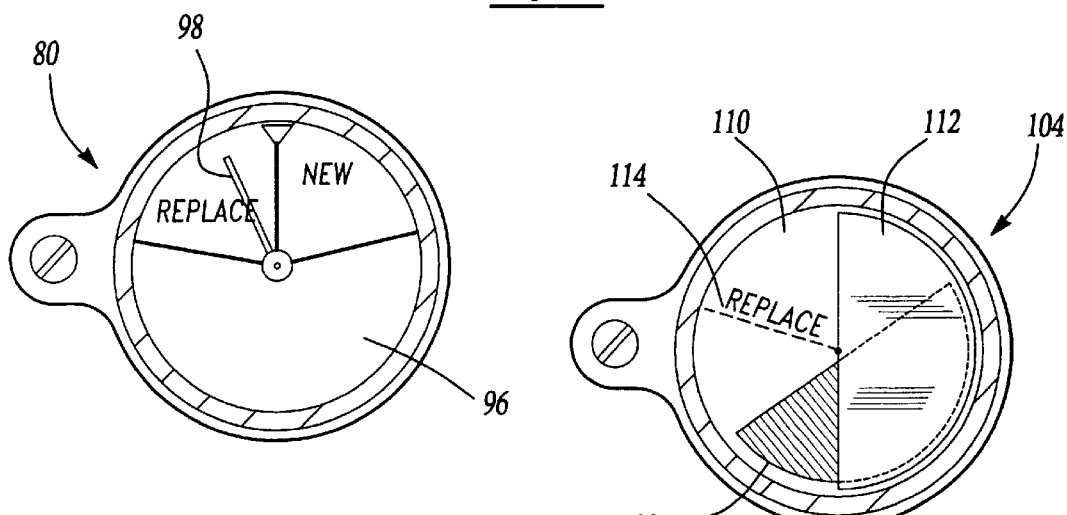
Fig-5
Fig-6

VISUAL WEAR INDICATOR FOR BRAKE SYSTEM

BACKGROUND OF THE INVENTION

The present invention relates to a visual wear indicator for an adjustable braking system. In known braking systems, an input to a lever rotates an eccentric rotatably mounted in an actuating block. A load plate bearing friction material is mounted to the actuating block. Upon rotation of the eccentric, the actuating block, load plate and friction material are moved towards a rotor, causing the friction material to contact the rotor. The friction material causes resistance to the motion of the rotor.

Normally the friction material is maintained slightly out of contact with the rotor when the braking system is in the non-activated or rest position. Gradually the friction material becomes worn, and is spaced further and further away from the rotor, reducing the braking power of the braking system. Adjustment assemblies adjust the distance of the friction material from the rotor.

One such adjustment assembly is disclosed in co-pending application Ser. Nos. 08/747,141 and 08/747,139, the assignee of which is the assignee of the present invention. In that system, an eccentric is rotatably mounted within an actuator block. Rotation of the eccentric reciprocates the actuation block, moving a pair of adjusting sleeves toward the rotor. A threaded connector is threaded within each adjusting sleeve and abuts an adjusting piston. Both adjusting pistons are bolted to a load plate which is secured to a backing plate and friction material. Upon rotation of the eccentric, the actuation block reciprocates, driving the actuation sleeves, threaded connectors, adjusting pistons, load plate and friction material forwardly against the rotor. In order to adjust the braking position of the load plate as the friction material becomes worn, the adjustment assembly adjusts the position of the and friction material relative to the actuation block. Rotation of the eccentric beyond a certain threshold causes rotation of an actuation gear section which causes rotation of the adjustment sleeves. Rotation of the adjustment sleeves causes axial movement of the non-rotatable threaded connectors (and consequently the adjusting pistons and load plate) toward the rotor relative to the actuation block. This system provides automatic adjustment of the braking position of the load plate and friction material; however, because the adjustment is automatic, it is difficult to determine when the friction material has become sufficiently worn that it must be replaced.

SUMMARY OF THE INVENTION

The present invention provides a brake system having an indicator indicating when the adjustment of the position of a load plate has exceeded a predetermined threshold.

A braking system according to the present invention generally comprises a friction material positioned adjacent a rotor. The friction material is secured to a load plate mounted on an actuation block. An eccentric is rotatably mounted in the actuation block such that rotation of the eccentric causes movement of the actuation block, load plate and friction material toward the rotor. The braking system further includes an adjustment assembly, mechanically coupling the load plate to the actuation block, for adjusting the position of the load plate relative to the actuation block. An indicator indicates when the adjustment assembly has adjusted the position of the load plate to a predetermined position or beyond a predetermined threshold.

Preferably the adjustment assembly includes a rotatable member threadably engaging and rotating relative to a threaded non-rotatable member. The indicator indicates the adjustment of the load plate based upon the rotation of the rotatable member.

The indicator preferably comprises an input shaft rotatably mounted in a housing. The input shaft drives a marker, such as a needle, positioned in front of an indicator face having indicia of several levels of brake wear. Gearing preferably reduces the rotation from the input shaft to the marker. The input shaft is coupled to the rotatable member of the adjustment assembly.

BRIEF DESCRIPTION OF THE DRAWINGS

FIG. 2 is a cross sectional view along line 2—2 as shown in FIG. 1;

FIG. 3 is the face of the visual wear indicator shown in FIG. 1 in an initial position;

FIG. 4 is the visual wear indicator of FIG. 2 in a second position indicating normal wear;

FIG. 5 is the visual wear indicator of FIG. 2 in a third position indicating that the brake system should be serviced; and FIG. 6 is an alternative visual wear indicator.

DETAILED DESCRIPTION OF A PREFERRED EMBODIMENT

Figure 1:
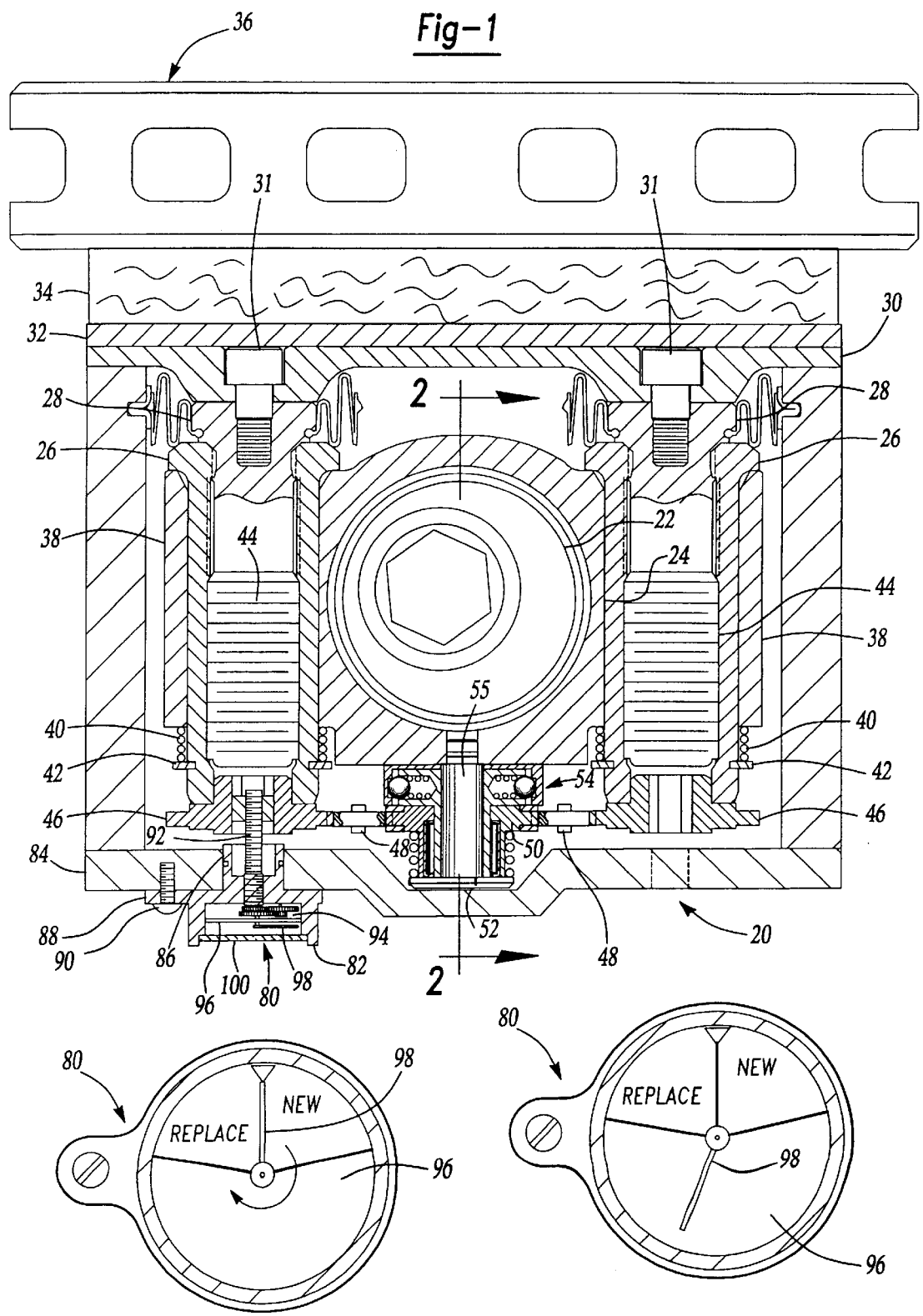
FIG. 1 is a cross sectional view of a brake system incorporating the present invention.

A vehicle braking system 20 is shown in FIG. 1 generally comprising an eccentric 22 which is rotatably mounted in an actuation block 24. Rotation of eccentric 22 within actuation block 24 reciprocates actuation block 24. A pair of adjusting sleeves 26 are engaged on either side of actuation block 24. Each adjusting sleeve 26 includes an adjusting piston 28 properly disposed within the adjusting sleeve 26. A load plate 30 is bolted 31 to both adjusting pistons 28. A brake pad generally comprising a backing plate 32 and friction material 34 is secured to adjusting load plate 30. The friction material 34 is positioned adjacent a rotor 36. FIG. 1 shows the friction material 34 when the brake system 20 is in the activated or braking position, i.e. the friction material 34 is in contact with the rotor 36. Normally, when the braking system 20 is in a rest or non-braking position, the friction material 34 is keep slightly out of contact with the rotor 36.

The actuation block 24 includes an outer portion 38 that surrounds adjusting sleeves 26. A spring 40 biases each adjusting sleeve 26 against the actuation block 24. A clip 42 is secured to each sleeve 26 to provide a reaction surface for the spring 40.

A threaded adjustment connection 44 is threaded within each adjusting sleeve 26 to transmit force between the adjusting sleeve 26 to the adjusting piston 28. Relative rotation between the threaded adjustment connection 44 and the adjusting sleeve 26 causes axial movement of the threaded adjustment connection 44 and consequently adjusting piston 28, relative to actuation block 24 thereby compensating for wear of the friction material 34. A gear 46 is fixed to rotate with each sleeve 26. The adjusting pistons 28 are constrained against rotation by bolt 31, the gears 46 are rotated through idler gears 48 by an adjustment gear 50. A one way clutch 52 insures that adjustment gear 50 is only rotated in a direction which causes the gears 46 to rotate and move friction material 34 closer to the rotor 36. The one way clutch 52 does not allow reverse rotation, and may be a needle bearing one way clutch as is known in the art. An over torque is also included and is mounted on a pin 55 fixed in block 24.

When the eccentric 22 rotates within the actuation block 24, the actuation block 24 is reciprocated towards the rotor 36, thereby moving the load plate 30 and friction material 34 into a braking position, in which the friction material 34 is in contact with the rotor 36 to move the friction material 34 into a braking position.

As can be seen in FIG. 2, an actuating lever 56 is connected to the eccentric 22. An adjustment gear section 58 rotates with the eccentric 22. Gear section 58 has teeth 60. Teeth 60 engage mating gear teeth 62 on an outer housing 63 which is incorporated into the over torque clutch 54. Outer housing 63 rotates an inner housing 68 through the over torque clutch 54. Inner housing 68 rotates adjustment gear 50 through the one way clutch 52.

Automatic adjustment of the braking position of the load plate 30 and friction material 34 is provided upon rotation of the eccentric 22. Rotation of the eccentric 22 causes rotation of actuation gear section 58. If there has been sufficient wear of the friction material 34, over torque clutch 54 drives inner housing 68. This in turn rotates the adjustment gear 50 through the one way clutch 52. Rotation of gear 50 causes rotation of the idler gears 48 and adjustment gears 46. This causes sleeves 26 to rotate, driving threaded adjustment connections 44 and adjusting pistons 28 and load plate 30 forwardly. When eccentric 22 returns to its non activated position, one way clutch 52 prevents the reversal of any adjustment.

The brake system 20 as described above and method for adjustment are described in co-pending application Ser. Nos. 08/747,141 and 08/747,139, the assignee of which is also the assignee of the present invention.

Referring to FIG. 1, a wear indicator 80 generally comprises a housing 82 mounted to a bracket 84 adjacent at least one of the adjusting sleeves 26. The housing 82 of the wear indicator 80 is secured to the brake system 20 by being at least partially inserted through a hole 86 in the bracket 84. The wear indicator 80 further includes an integral tab 88 for securing the wear indicator 80 to the bracket 84 with a fastener 90.

The wear indicator 80 includes an input shaft 92 rotatably mounted in the housing 82 and secured to the adjustment gear 46. The input shaft 92 extends into the housing 82 for connection to gearing 94 disposed within the housing 82. Gearing 94 is positioned behind a face 96 of the wear indicator 80 and operably connected to a marker, preferably a needle 98, disposed in front of the face 96. The wear indicator 80 further includes a clear cover 100 mounted in the housing 82 in front of the needle 98. Preferably, the gearing 94 provides a reduction in the rotation of the input shaft 92 to the needle 98 of 20:1 such that 20 revolutions of the input shaft 92 are required for a single revolution of the needle 98.

Referring to FIG. 3, the face 96 of the wear indicator 80 preferably includes indicia of various levels of brake wear, such as "new" and "replace." When the friction material 34 is new, and the load plate 30 is furthest from the rotor 36, the needle 98 is positioned adjacent first indicia on the face 96 indicating that the friction material 34 is new. As the friction material 34 becomes worn, rotation of gear 50 causes rotation of the idler gears 48 and adjustment gears 46. The rotation of the adjustment gears 46 is transmitted through input shaft 92 and reduced by gearing 94, causing rotation of the needle 98. As the friction material 34 begins to wear, the needle 98 begins to rotate to positions indicating a normal wear condition as shown in FIG. 4. As the friction material 34 continues to wear, the needle 98 continues to rotate to positions adjacent second indicia on the face 96 indicating that replacement of the brakes is required, as shown in FIG. 5.

The wear indicator 80 provides a visual indication of the adjustment of the position of the load plate 30 relative to the actuation block 24. The marker rotates based upon the amount of rotation of the rotatable parts in the adjustment assembly of the brake system 20.

An alternate wear indicator 104 is shown in FIG. 6 including a generally planar, semi-circular, opaque, preferably red marker 108 eccentrically connected to the input shaft 98 through gearing 94 as above (not shown). The wear indicator 104 further includes a cover 110 having an opaque portion 112 and a clear portion 114. The clear portion 114 includes "REPLACE" indicia that the friction material is worn and should be replaced. Initially, the marker is positioned behind the opaque portion 112 when the brake friction material 34 is in a new condition. Upon wear of the friction material 34 and adjustment of the brake as described above, the marker 108 rotates out from under the opaque portion 112 and is visible in the clear portion 114. When the marker 108 is reaches the "REPLACE" indicia in the clear portion 114, the friction material 34 must be replaced.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A brake system comprising:
    a load plate having a first surface;
    a friction material secured to said load plate;
    an actuation block;
    an adjustment assembly mechanically coupling said load plate to said actuation block, said adjustment assembly adjusting the position of said load plate relative to said actuation block;
    an eccentric rotatably mounted in said actuation block, rotation of said eccentric within said actuation block causing movement of said adjustment assembly and said load plate in a first direction; and
    an indicator indicating when said adjustment assembly has adjusted the position of said load plate to a predetermined position relative to said actuation block.

2. The brake system of claim 1 wherein said adjustment assembly includes at least one rotatable member threadably engaging and rotating relative to a threaded non-rotating member, said indicator indicating the position of said load plate relative to said actuation block based upon rotation of said rotatable member.

3. The brake system of claim 2 wherein said indicator includes a marker rotating based upon rotation of said rotatable member relative to said non-rotating member.

4. The brake system of claim 3 further including a gearing assembly between said rotatable member and said marker, such that the ratio of rotation of said marker to that of the rotatable member is less than one.

5. The brake system of claim 3 wherein said marker is rotatable relative to a fixed face having indicia of brake wear level.

6. The brake system of claim 3 wherein said adjustment assembly further includes an adjustment gear coupled to said rotatable member, said marker coupled to said adjustment gear.

7. The brake system of claim 3 wherein said marker is a needle.

8. The brake system of claim 3 wherein said marker is generally planar and eccentrically coupled to rotate within a housing, said indicator further including a cover having an opaque portion and a clear portion, said marker initially positioned behind one of said clear portion and said opaque portion when said load plate is in said predetermined position, said marker behind the other of said clear portion and said opaque portion when said load plate is not in said predetermined position.

9. A brake system comprising:
- a load plate having friction material, said load plate being movable from a rest position to a braking position in which said friction material frictionally engages a surface;
- an adjustment assembly adjusting said braking position of said load plate, said adjustment assembly including a rotatable member rotating based upon adjustment of said braking position of said load plate; and
- an indicator indicating a wear condition of said friction material based upon said rotation of said rotatable member.

10. The brake system of claim 9 wherein said rotatable member threadably engages a threaded non-rotating member, said indicator indicating a wear condition based upon rotation of said rotatable member relative to said non-rotating member.

11. The brake system of claim 9 wherein said indicator includes a marker rotating based upon rotation of said rotatable member.

12. The brake system of claim 11 further including a generally planar marker coupled to rotate eccentrically within a housing, said indicator further including a cover having an opaque portion and a clear portion, said marker initially positioned behind one of said clear portion and said opaque portion when said load plate is in a first braking position, said marker behind the other of said clear portion and said opaque portion when said load plate is in an adjusted second braking position.

13. The brake system of claim 11 further including a gearing assembly between said rotatable member and said marker, such that the ratio of rotation of said marker to that of the rotatable member is less than one.

14. The brake system of claim 11 wherein said marker rotates adjacent a face having indicia of brake wear level.

15. The brake system of claim 14 wherein said face includes first indicia of new friction material, second indicia of normal wear of said friction material, and third indicia that said friction material should be replaced.

16. An indicator for a brake system comprising:
- a housing;
- an input member for receiving a rotating input from a rotating brake adjustment component, said input member rotatably mounted in said housing;
- means for securing said housing to the brake system; and
- a display indicating when the rotation of said rotating brake adjustment component has exceeded a predetermined threshold.

17. The indicator of claim 16 wherein said display includes a marker rotating relative to a fixed face having indicia of brake wear level.

18. The indicator of claim 17 wherein said face includes first indicia of new brake, second indicia of normal wear, and third indicia that said brake should be replaced.

19. The indicator of claim 17 further including a gearing assembly between said input member and said marker, such that the ratio of rotation of said marker to that of the input member is less than one.

20. The indicator of claim 17 wherein said marker is generally planar and eccentrically coupled to rotate within said housing, said indicator further including a cover having an opaque portion and a clear portion, said marker initially positioned behind one of said clear portion and said opaque portion when said rotating brake adjustment component has not rotated, said marker positioned behind the other when said rotating brake adjustment component has rotated beyond said predetermined threshold.

* * * * *